July 6, 1965 K. A. SCHAFER 3,193,598
PROCESS OF MOLDING LAMINATING PREFORMS OF FOAMED
POLYURETHANE HAVING OPEN, CONNECTED CELLS
Filed Aug. 16, 1961

INVENTOR.
KENNETH A. SCHAFER
BY
Harry B. Keck
ATTORNEY

United States Patent Office 3,193,598
Patented July 6, 1965

3,193,598
PROCESS OF MOLDING LAMINATING PREFORMS OF FOAMED POLYURETHANE HAVING OPEN, CONNECTED CELLS
Kenneth A. Schafer, Cedarburg, Wis., assignor to Freeman Chemical Corporation, Port Washington, Wis., a corporation of Delaware
Filed Aug. 16, 1961, Ser. No. 131,846
2 Claims. (Cl. 264—54)

This invention relates to a process of molding laminated preforms having open, connected cells. The present preforms are useful in the fabrication of laminating articles from thermosetting resinous compositions with or without fibrous reinforcing materials.

The use of thermosetting resinous compositions such as unsaturated polyester resinous compositions together with fibrous reinforcing materials for the fabrication of laminated articles is widely known. Glass fiber mats and woven glass fiber fabrics have been utilized together with unsaturated polyester resinous compositions in the fabrication of boat hulls, automobile vehicle parts such as fenders, body moldings and the like, helmets, furniture, machinery cases, machinery covers and the like. Where the ultimate laminated article is relatively flat or free of compound curvatures, the glass fibers or glass fabrics are applied directly into a molding cavity which is thereafter filled with the thermosetting resinous composition in liquid form. The curing of the thermosetting resinous composition creates a strong laminated article which is removed from the mold. The glass fibers or glass fabric provides the structural strength required in such articles. The thermosetting resinous composition, in addition to serving as a binding agent for the fibers, presents an attractive, smooth outer surface for the resultant article.

Where articles having severe compound curvatures are fabricated, for example, chair seats, the glass fibers frequently are provided in a preform which corresponds to the configuration of the molding cavity. The preform glass fiber mats are introduced into the molding cavity together with a supply of the thermosetting resinous material. The use of preforms has facilitated the molding of glass fiber laminated articles.

In my copending application S.N. 125,272, filed July 19, 1961, assigned to the assignee of the present invention, there is described an improved glass fiber laminated article having a sheet of foamed resinous material in sheet form extended over at least one surface of a glass fiber mat. The preferred foamed resin is foamed polyurethane.

Where severe compound curvatures are encountered in the desired laminated articles, the use of sheet foamed resins presents some difficulties in draping the sheet to conform to the molding cavity without folds and laps. According to the present invention, laminating preforms are prepared from foamed resin sheets for simplified introduction into the molding cavities which are employed in the fabrication of laminated articles.

In one embodiment of this invention the laminating preforms of foamed resin sheets are formed by stretching the readily compressible, flexible, elastic sheet of open, connected celled foamed resin over a special molding form which corresponds to the molding cavity. Through application of heat while the foamed resin sheet is stretched taut over the molding form, the sheet will flow and assume the contour of the molding form. After the flow has been completed, the sheet may be removed from the molding form as a laminating preform which can be inserted directly into a molding cavity.

In an alternative embodiment of this invention a special additional molding cavity is provided for preparing the present laminating preform by foaming a suitable foamable resinous material in the special additional molding cavity which corresponds in its contours to the ultimate molding cavity wherein the resultant laminated article will be fabricated. The special additional molding cavity may have a greater, equal or lesser thickness than the molding cavity in which the resultant laminated article is fabricated. The preform normally will possess substantially uniform thickness. When the foamed resin preform is prepared in this manner, some subsequent treatment will be necessary in order to break down the cell wall structure to develop the requisite open, connected cellular structure which is required for fabricating suitable laminated articles.

In a still further embodiment of this invention, a special additional molding cavity may be filled with randomly oriented fibrous materials prior to the foaming of a foamable resinous material therein. The resulting laminating preform thus will contain the foamed resinous material having randomly dispersed therein the fibrous reinforcing materials whereby only one laminating preform is required in a laminating fabrication utilizing both fibrous materials and foamed resinous materials.

*Foamed resins*

The foamed resinous material, as heretofor mentioned, is preferably foamed polyurethane having open, connected cells. Other materials which have been investigated have been found to be undesirable for want of one or more of the following features.

The foamed resin must possess:
(1) Open-celled configuration;
(2) Flexibility;
(3) Elasticity;
(4) Ready compressibility; and
(5) Wettability with the liquid thermosetting resin.

Polyurethane foam is eminently satisfactory in the above-listed properties where the thermosetting resin is unsaturated polyester resin or epoxy resins.

The preferred foamed resin has cells of substantially uniform diameter in the range of 0.001 to 0.5 inch. The material may be provided in sheet form having a thickness from about 0.05 to 2.0 inches in its uncompressed form. Such sheets may be readily compressed to a minor fraction of the uncompressed thickness.

The cells of the foamed resin must be open and connected. Polyurethane foams having open, connected cell structures have been described in U.S. Patent 2,961,710 and Canada Patent 620,248. The cell-wall breakdown described in these references is accomplished through the action of organic solvents and inorganic reagents acting upon the customary closed-cell polyurethane foams.

*Thermosetting resins*

Unsaturated polyester resins are well-known in the art as a thermosetting resinous material. Such resinous compositions are widely utilized in the fabrication of furniture, automotive vehicle parts such as fenders and body-moldings, boat hulls, machinery cases, machinery covers, helmets and the like. Frequently the unsaturated polyester resins are utilized in combination with fibrous reinforcing materials such as glass fiber mats, glass fiber fabrics, sisal fibers, hog-hair fibers, and the like. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formulate a typical unsaturated polyester resinous composition. On heating, such compositions form three-dimensional (thermoset) polymeric bonds without substantial shrinkage through application of heat in the presence of a suitable polymerization catalyst such as benzoyl peroxide. Customarily the thermosetting resinous compositions contain suitable pigmentation to present an opaque surface when cured. The precise formulation of unsaturated polyester resinous compositions forms no part of the present invention.

In the present laminated articles, the compressed foamed resins present an attractive grain surface appearance in combination with the thermosetting resinous compositions. Where the cells of the foamed resin are relatively large, the resulting surface appearance is marbleized. Where the cells of the foamed resin are relatively small, a finer grain surface is achieved which is similar to fine grain leather. The foamed resin furthermore prevents the fibrous materials from approaching the external surface of the laminated article where they accelerate wear and surface deterioration.

The principal object of this invention is to provide laminating preforms of foamed resin having open, connected cells.

A further object of this invention is to provide a process for preparing foamed resin laminating preforms having open, connected cells.

A still further object of this invention is to provide a laminating preform having a foamed resin with an open, connected cellular structure and having randomly dispersed therethrough a quantity of fibrous reinforcing materials.

Another object of this invention is to provide improved laminated articles utilizing thermosetting resinous compositions.

These and other objects and advantages of the present invention will become apparent from the following detailed discussion by reference to the accompanying drawings in which.

Figure 1:
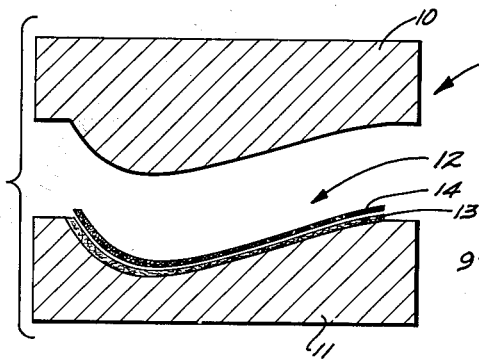
FIGURE 1 is a cross-section illustration of a typical molding apparatus used in the fabrication of laminated articles from thermosetting resinous compositions and fibrous reinforcing materials.
Figure 2:
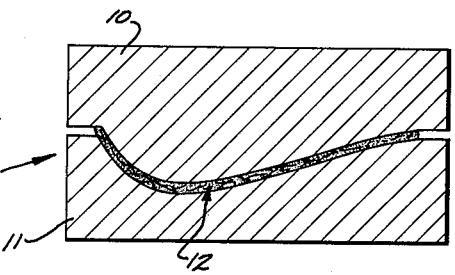
FIGURE 2 is a cross-section illustration of the molding apparatus of FIGURE 1 in its closed (or molding) position.
Figure 5:
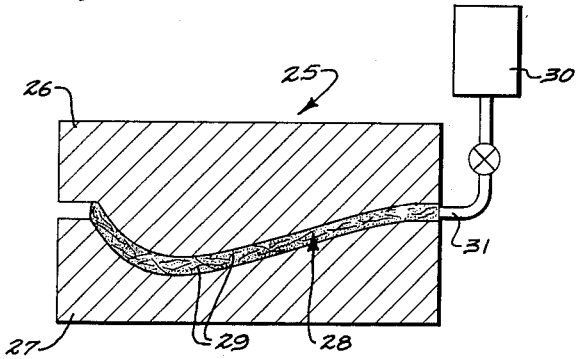
Figure 6:

FIGURE 5 is a cross-section illustration of an additional molding apparatus for foaming a laminating preform including a foamable resinous material togther with a fibrous reinforcing material for ultimate use in the laminating molding apparatus of FIGURES 1 and 2; and FIGURE 6 is a cross-section illustration of the laminating preform prepared in the molding apparatus of FIGURE 5 ready for use in the molding apparatus of FIGURES 1 and 2.

Referring to FIGURE 1 there is illustrated a typical molding apparatus 9 for laminated articles including an upper element 10 and a lower element 11. A mold cavity 12 is formed between the two elements 10, 11 when they are brought together. The molding cavity normally is filled with a fibrous reinforcing material such as a glass fiber mat 13 which is preformed to the general contour of the mold cavity 12. Thereafter a supply of thermosetting resinous composition is poured in liquid form into the mold cavity 12 to impregnate the glass fiber mat 13. Thereafter the mold elements 10, 11 are brought together as seen in FIGURE 2 and the glass fiber mat 13 is compressed whereby the void spaces in the mold cavity 12 are substantially entirely filled with the thermosetting resinous composition. Since a suitable polymerization initiator normally is included in the thermosetting resinous composition, the application of some heat to the molding elements, 10, 11 results in a curing of the thermosetting resinous composition to a hardened thermoset condition.

According to my abovementioned copending application S. N. 125,272 filed July 19, 1961, improved laminates are produced by the inclusion of a sheet of foamed resinous material having open, connected cells in the mold cavity 12. Such a sheet 14 is illustrated in FIGURE 1. While the flexibility and drapability of foamed resinous materials permits ready conformation to the molding cavity 12, the purpose of this invention is to provide such foamed resinous materials in preformed shapes to conform to the mold cavity 12. Hence the foamed resin as well as the fibrous reinforcing material 13 can be provided separately in preformed corresponding shapes to facilitate the molding operations.

Figure 3:
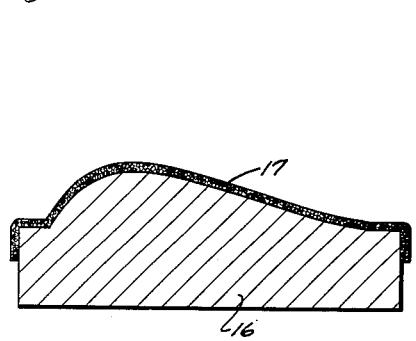
FIGURE 3 is a cross-section illustration of an additional molding form corresponding to the molding cavity of the apparatus of FIGURES 1 and 2.

One means for preparing the laminating preforms of this invention is illustrated in FIGURE 3 where a molding element 16 is provided which conforms in its contours to the molding element 10. A sheet of foamed resin 17 having open, connected cells is stretched tautly over the contoured surface of the molding element 16 which is heated to a temperature from about 200 to 500° F. until the foamed resin sheet 17 flows and conforms to the shape of the molding element 16. When this occurs, the contoured sheet 17 of foamed resin is removed from the molding element 16 as a laminating preform which can be placed directly in the molding cavity 12.

Figure 4:
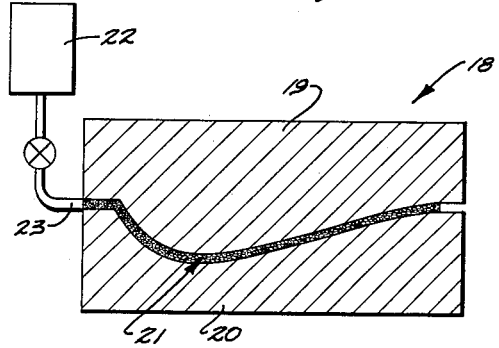
FIGURE 4 is a cross-section illustration of a molding apparatus which can be utilized in the prepartion of laminating preforms from foamable resinous materials for ultimate use in the molding apparatus of FIGURES 1 and 2.

A preferred embodiment of this invention is illustrated in FIGURE 4 where a special additional molding apparatus 18 is provided including an upper element 19 and a lower element 20. The elements 19, 20, when brought together, define a molding cavity 21 which corresponds to the molding cavity 12, but which may be substantially thicker. A quantity of foamable polyurethane resin is introduced into the molding cavity 21 from a container 22 through a pipe 23. The foamable polyurethane resin is allowed to foam within the molding cavity 21 to generate a molded shape from foamed polyurethane resin having the exact contour of the molding cavity 21 and the general contour of the molding cavity 12. Since the foamed polyurethane shape created in the molding cavity 21 has normally closed cells, some pretreatment will be required to provide the open, connected cellular structure which is necessary in the fabrication of acceptable laminating components. Such pretreatments have been described in the literature supra.

After the foamed resin laminating preform has been suitably treated to provide open, connected cellular structure, it is positioned within the mold cavity 12 with or without a fibrous reinforcing mat 13 as the foamed resin component of the laminated article. Thermosetting resinous composition in liquid form is added to the molding cavity 12 and allowed to cure to a hardened thermoset condition while impregnated throughout the foamed resin laminating preform and the fibrous reinforcing material, if any.

The resulting laminated article develops an attractive grained surface where the thermosetting resinous composition has opacity. Where the thermosetting resinous composition is clear and a neutral colored foamed resin laminating preform is provided, the resulting laminated article will be clear.

A further alternative embodiment of this invention is illustrated in FIGURES 5 and 6 where a special additional molding apparatus 25 includes an upper element 26 and a lower element 27. When the molding apparatus 25 is closed by bringing together the elements 26, 27, a molding cavity 28 is defined. A supply of fibrous reinforcing material 29 is distributed in a random orientation throughout the molding cavity 28 and a supply of foamable polyurethane resin is introduced into the molding cavity 28 from a container 30 through a pipe 31. The foamable polyurethane resin is allowed to foam within the molding cavity 28 whereby the foamed resin completely fills the molding cavity 28 and surrounds the fibrous reinforcing material 29. The molding cavity 28 corresponds to the molding cavity 12 but will be substantially thicker whereby a laminating preform 32 (FIGURE 6) is formed having randomly oriented fibrous reinforcing material 29 dispersed throughout a foamed polyurethane mass. The foamed polyurethane will require some additional pretreatment for breaking down the cell walls to create the requisite open, connected cellular structure. Treatments as described in the literature supra may be employed for this purpose.

The composite laminating preform 32 can be positioned within the molding cavity 12 as a unitary preform for impregnation with a suitable thermosetting resinous composition. The compressibility of the foamed polyurethane composition permits it to abut the molding surfaces of the molding cavity 12 whereby the cellular configuration appears on the surface in an attractive manner.

By utilizing a foamed polyurethane of one coloration (e.g., red, blue, green et cetera) and an opaque thermosetting resinous composition of another coloration (e.g., white, gray, buff, et cetera), limitless variations in surface presentation can be achieved. Varying the cell sizes also serves to provide variations in the surface presentation. Varying the amount of compression of the laminating preform of this invention within the molding cavity also serves to vary the surface presentation.

If desired, the laminating preforms may be impregnated with a suitable thermosetting resinous composition in liquid form prior to introduction into a molding cavity.

I claim:

1. The method of preparing a polymerizable resin-impregnated laminating preform which comprises foaming in a shaped molding apparatus a foamable polyurethane composition to fill the cavity of the said molding apparatus, removing from the said molding apparatus a foamed polyurethane resinous mass having the desired shape for a laminating preform, treating the said resinous mass to open the cellular structure and to create open, connected cells in the said shaped form, impregnating the resulting foamed resinous mass with a thermosetting resinous composition in liquid form, and recovering the resulting impregnated resinous mass as a laminating preform.

2. The method of claim 1 wherein the said thermosetting resinous composition is a polymerizable unsaturated polyester resin.

References Cited by the Examiner

UNITED STATES PATENTS

| 2,151,410 | 3/39 | Richter | 264—321 XR |
| 2,666,954 | 1/54 | Potter | 264—321 XR |
| 2,845,997 | 8/58 | Waite. | |
| 2,855,021 | 10/58 | Hoppe. | |
| 2,863,797 | 12/58 | Meyer. | |
| 2,879,197 | 3/59 | Muskat et al. | |
| 2,961,710 | 11/60 | Stark | 264—321 XR |
| 3,000,464 | 9/61 | Watters | 264—41 XR |
| 3,025,200 | 3/62 | Powers | 264—54 XR |
| 3,050,432 | 8/62 | Weinbrenner et al. | 264—321 XR |

FOREIGN PATENTS

| 582,122 | 8/59 | Canada. |
| 620,248 | 5/61 | Canada. |
| 944,285 | 6/56 | Germany. |
| 800,474 | 8/58 | Great Britain. |

ALEXANDER H. BRODMERKEL, *Primary Examiner.*
CARL F. KRAFFT, *Examiner.*